(12) United States Patent
Amako et al.

(10) Patent No.: US 8,570,509 B2
(45) Date of Patent: Oct. 29, 2013

(54) SPECTROMETRY APPARATUS, DETECTION APPARATUS, AND METHOD FOR MANUFACTURING SPECTROMETRY APPARATUS

(75) Inventors: Jun Amako, Matsumoto (JP); Kohei Yamada, Minowa (JP)

(73) Assignee: Seiko Epson Corporation (JP)

( * ) Notice: Subject to any disclaimer, the term of this patent is extended or adjusted under 35 U.S.C. 154(b) by 203 days.

(21) Appl. No.: 13/106,373

(22) Filed: May 12, 2011

(65) Prior Publication Data

US 2011/0279818 A1 Nov. 17, 2011

(30) Foreign Application Priority Data

May 13, 2010 (JP) .................. 2010-111124

(51) Int. Cl.
*G01J 3/28* (2006.01)
*G02B 21/36* (2006.01)

(52) U.S. Cl.
USPC ............ 356/328; 359/569; 359/566; 359/574

(58) Field of Classification Search
USPC .................. 356/328; 359/558, 556, 569–574
See application file for complete search history.

(56) References Cited

U.S. PATENT DOCUMENTS

| | | | |
|---|---|---|---|
| 4,506,949 A | 3/1985 | Knop | |
| 5,009,484 A | 4/1991 | Gerritsen | |
| 6,487,019 B2* | 11/2002 | Hoose | 359/575 |
| 6,900,939 B2* | 5/2005 | Hoshi et al. | 359/569 |
| 6,917,471 B2* | 7/2005 | Shiozaki et al. | 359/563 |
| 7,081,955 B2 | 7/2006 | Teichmann et al. | |
| 7,164,532 B2* | 1/2007 | Funato et al. | 359/569 |
| 7,319,559 B2 | 1/2008 | Nakama et al. | |
| 7,590,150 B1* | 9/2009 | Damle et al. | 370/474 |
| 7,688,512 B2 | 3/2010 | Kittaka et al. | |

FOREIGN PATENT DOCUMENTS

| | | |
|---|---|---|
| JP | 2004-354176 | 12/2004 |
| JP | 2005-208331 | 8/2005 |
| JP | 2006-113021 | 4/2006 |
| JP | 2007-101926 | 4/2007 |
| JP | 2008-102488 | 5/2008 |
| WO | 2009-135982 | 11/2009 |

OTHER PUBLICATIONS

Extended European Search Report for Application No. 11 16 5662.5, Aug. 18, 2011, (7 pages).
Latest edition of Complete Technologies of Diffractive Optical Elements, Technical Information Institute Co., Ltd., (pp. 107-120) 2004, with English Translation.

* cited by examiner

*Primary Examiner* — Layla Lauchman
(74) *Attorney, Agent, or Firm* — Harness, Dickey & Pierce, P.L.C.

(57) ABSTRACT

A spectrometry apparatus includes a transmissive diffraction grating that transmits incident light. The transmissive diffraction grating has inclined surfaces made of a first dielectric material. The inclined surfaces are arranged so that they are inclined relative to a reference line. When the angle of incidence of light incident on the transmissive diffraction grating is measured with respect to the reference line and defined as an angle $\alpha$, and the angle of diffraction of diffracted light is measured with respect to the reference line and defined as an angle $\beta$, the angle of incidence $\alpha$ is smaller than a Bragg angle $\theta$ defined with respect to the inclined surfaces, and the angle of diffraction $\beta$ is greater than the Bragg angle $\theta$.

15 Claims, 11 Drawing Sheets

COMPARATIVE EXAMPLE

COMPARATIVE EXAMPLE

FIG. 5A  φ=0°
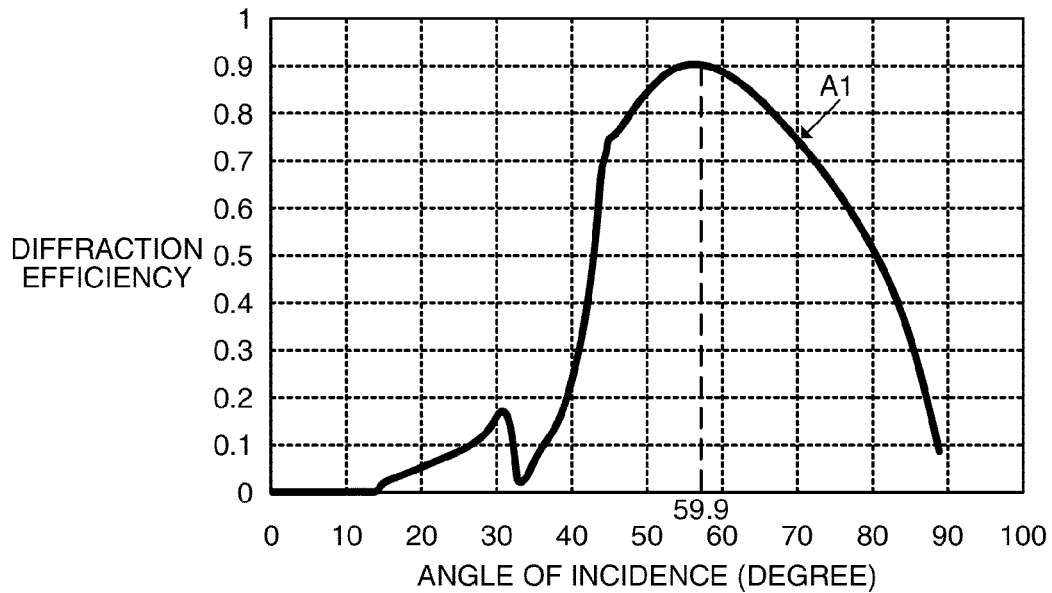
FIG. 5B  φ=10°
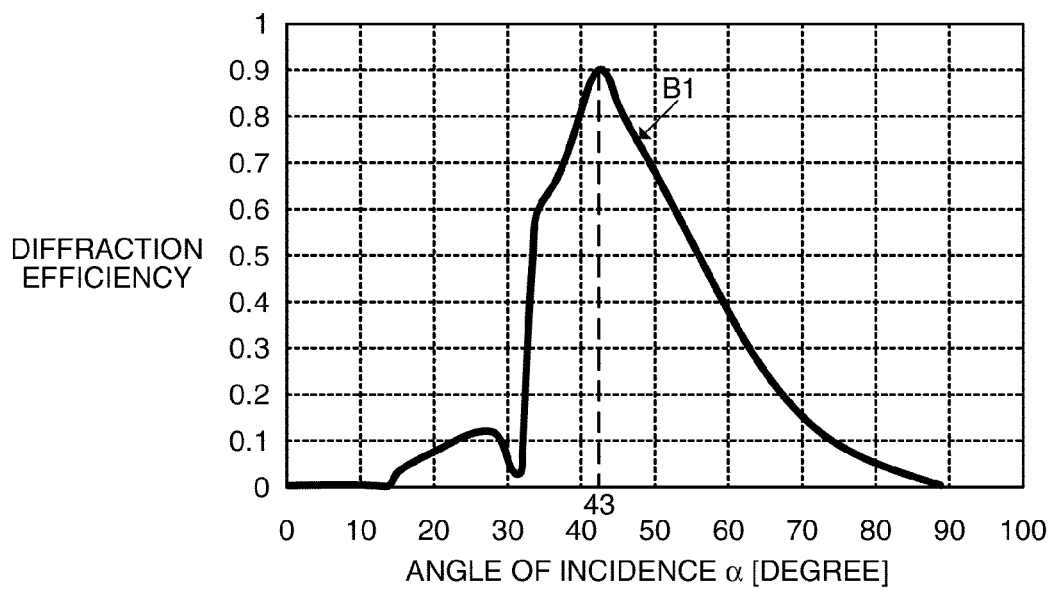

FIG. 6A  P= 333nm
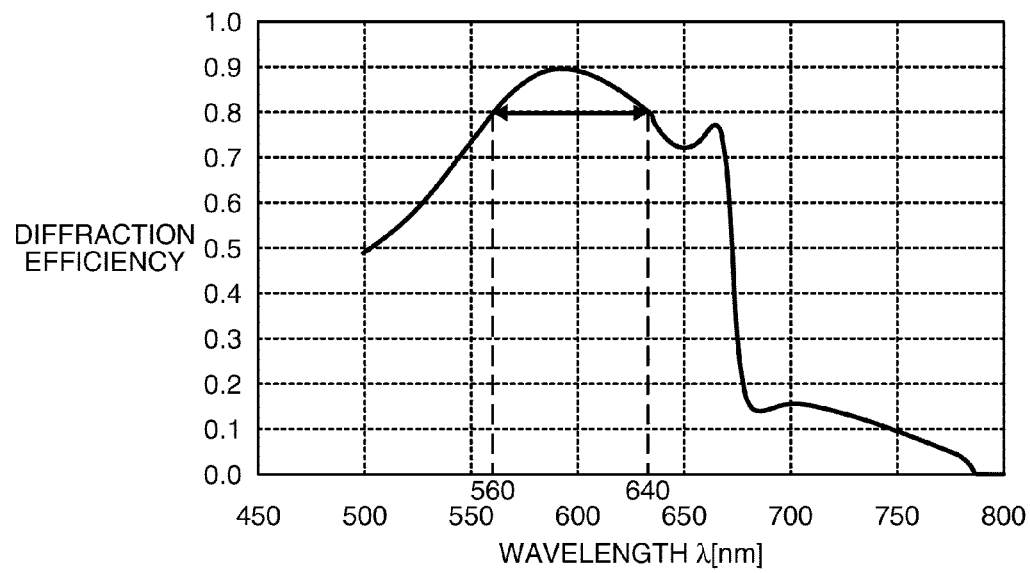
FIG. 6B  P= 366nm
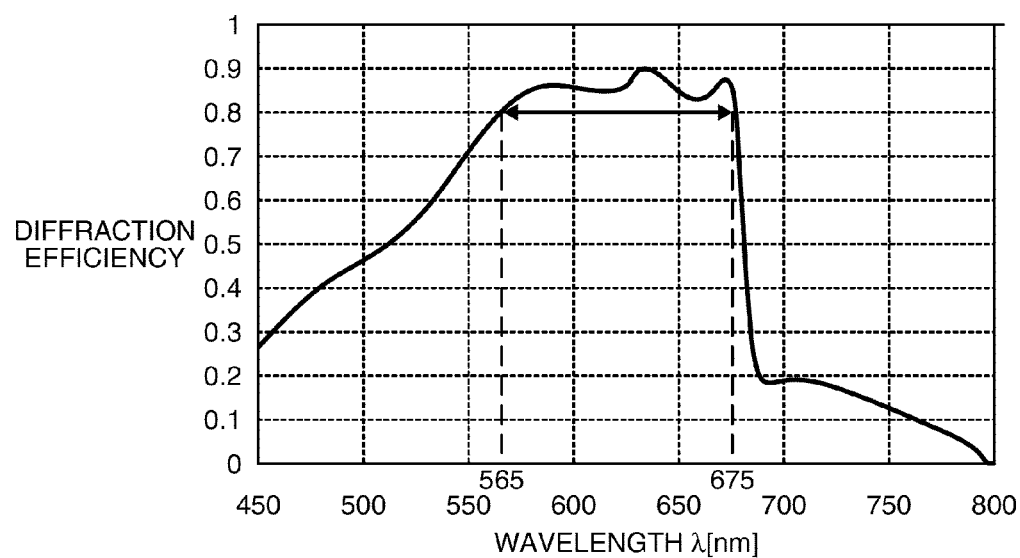

SPECTROMETRY APPARATUS, DETECTION APPARATUS, AND METHOD FOR MANUFACTURING SPECTROMETRY APPARATUS

This application claims priority to Japanese Patent Application No. 2010-111124 filed May 13, 2010 which is hereby expressly incorporated by reference herein in its entirety.

BACKGROUND

1. Technical Field

The present invention relates to a spectrometry apparatus, a detection apparatus, a method for manufacturing the spectrometry apparatus, and other apparatuses and methods.

2. Related Art

Many diffraction gratings used in Raman spectrometers and other spectrometry apparatuses are reflective diffraction gratings. A reflective diffraction grating is, for example, a blazed grating having a saw-tooth cross-sectional shape (diffraction grating described in JP-A-2004-354176, for example).

A reflective diffraction grating, however, has difficulty in improving wavelength resolution and widening the wavelength band where high diffraction efficiency is provided at the same time. For example, a blazed diffraction grating, which has a blazed cross-sectional shape, provides improved diffraction efficiency. In a blazed diffraction grating, however, narrowing the grating period in order to improve the wavelength resolution greatly reduces the wavelength band where high diffraction efficiency is provided.

SUMMARY

An advantage of some aspects of the invention is to provide a spectrometry apparatus that allows improvement in both wavelength resolution and diffraction efficiency, a detection apparatus, and a method for manufacturing the spectrometry apparatus, and other apparatuses and methods.

A spectrometry apparatus according to a first aspect of the invention includes a transmissive diffraction grating that transmits incident light. The transmissive diffraction grating has inclined surfaces made of a first dielectric material. The inclined surfaces are arranged so that they are inclined relative to a reference line. When the angle of incidence of light incident on the transmissive diffraction grating is measured with respect to the reference line and defined as an angle α, and the angle of diffraction of diffracted light is measured with respect to the reference line and defined as an angle β, the angle of incidence α is smaller than a Bragg angle θ defined with respect to the inclined surfaces, and the angle of diffraction β is greater than the Bragg angle θ.

According to the first aspect of the invention, inclined surfaces made of a first dielectric material are arranged so that they are inclined relative to a reference line. Light is incident on the transmissive diffraction grating at an angle α smaller than a Bragg angle θ, and light diffracted by the transmissive diffraction grating exits at an angle β greater than the Bragg angle θ. As a result, for example, the wavelength resolution can be improved, and the wavelength band where high diffraction efficiency is provided can be widened.

In the first aspect of the invention, when the inclination angle of the inclined surfaces with respect to the reference line is defined as an angle φ, the inclined surfaces may be arranged at a period P/cos φ measured in a direction perpendicular to the reference line. The incident light may be linearly polarized parallel to a flat surface perpendicular to the reference line and perpendicular to the direction in which the inclined surfaces are arranged.

The configuration described above allows the inclined surfaces to be arranged so that they are inclined relative to the reference line by the angle φ, light linearly polarized parallel to the inclined surfaces and perpendicular to the reference line to be incident on the transmissive diffraction grating, and diffracted light from the transmissive diffraction grating to be collected.

In the first aspect of the invention, when the inclination angle of the inclined surfaces with respect to the reference line is defined as an angle φ, a group of protrusions made of the first dielectric material may be formed at a period P/cos φ on a flat surface of a base of the transmissive diffraction grating, the flat surface being perpendicular to the reference line and the group of protrusions arranged along a direction parallel to the flat surface of the base. The inclined surfaces inclined relative to the reference line by the angle φ may be formed on the group of protrusions.

The configuration described above allows the group of protrusions to be arranged periodically and the inclined surfaces to be arranged at a period P measured in a direction perpendicular to the inclined surfaces.

In the first aspect of the invention, the inclination angle φ may be set so that adjacent protrusions do not overlap with each other in a plan view projected onto the flat surface of the base.

The configuration described above allows the inclination angle φ to be set so that adjacent protrusions do not overlap with each other in a plan view projected onto the flat surface of the base, whereby, for example, simulations can be made more precisely.

In the first aspect of the invention, when the inclination angle of the inclined surfaces with respect to the reference line is defined as an angle φ, the transmissive diffraction grating may be formed by alternately arranging the first dielectric material and a second dielectric material having a dielectric constant different from that of the first dielectric material at a period P/cos φ on a base having a flat surface perpendicular to the reference line along a direction parallel to the flat surface of the base. The inclined surfaces may be formed of boundary surfaces between the first dielectric material and the second dielectric material and inclined relative to the reference line by the angle φ.

The configuration described above allows the first dielectric material and the second dielectric material to be arranged periodically and the inclined surfaces to be arranged at a period P measured in a direction perpendicular to the inclined surfaces.

In the first aspect of the invention, the transmissive diffraction grating may have the inclined surfaces formed on a first surface of the base on which the incident light is incident and an anti-reflection film formed on a second surface of the base through which the diffracted light exits.

The configuration described above allows the incident light to be incident on the inclined surfaces without passing through the base. Further the anti-reflection film can suppress reflection of the diffracted light, whereby efficient spectrometry can be performed.

A detection apparatus according to a second aspect of the invention includes any of the spectrometry apparatuses described above, an optical system that allows scattered light or reflected light from a target to be incident on the spectrometry apparatus at the angle of incidence α smaller than the Bragg angle θ, and a detector that detects diffracted light from the spectrometry apparatus.

A method for manufacturing any of the spectrometry apparatuses described above according to a third aspect of the invention includes irradiating a photoresist applied on a base with first laser light and second laser light so that the photoresist undergoes interference exposure, developing the photoresist having undergone the interference exposure, and forming a photoresist pattern inclined relative to a normal to a flat surface of the base by an inclination angle $\phi$.

BRIEF DESCRIPTION OF THE DRAWINGS

The invention will be described with reference to the accompanying drawings, wherein like numbers reference like elements.

FIG. 5A shows an exemplary characteristic curve representing diffraction efficiency versus the angle of incidence for an inclination angle of 0°, and FIG. 5B shows an exemplary characteristic curve representing diffraction efficiency versus the angle of incidence in the present embodiment.

FIG. 6A shows an exemplary characteristic curve representing the diffraction efficiency versus a wavelength $\lambda$ for an inclination angle of 0°, and FIG. 6B shows an exemplary characteristic curve representing the diffraction efficiency versus the wavelength $\lambda$ in the present embodiment.

DESCRIPTION OF EXEMPLARY
EMBODIMENTS

A preferred embodiment of the invention will be described below in detail. The embodiment described below is not intended to limit the contents of the invention set forth in the claims. Further, not all of the components described in the embodiment are essential to the invention.

1. Comparative Example

A blazed diffraction grating has difficulty in providing high wavelength resolution and high diffraction efficiency at the same time, as described above. This problem will be described with reference to FIGS. 1 and 2.

Figure 1:
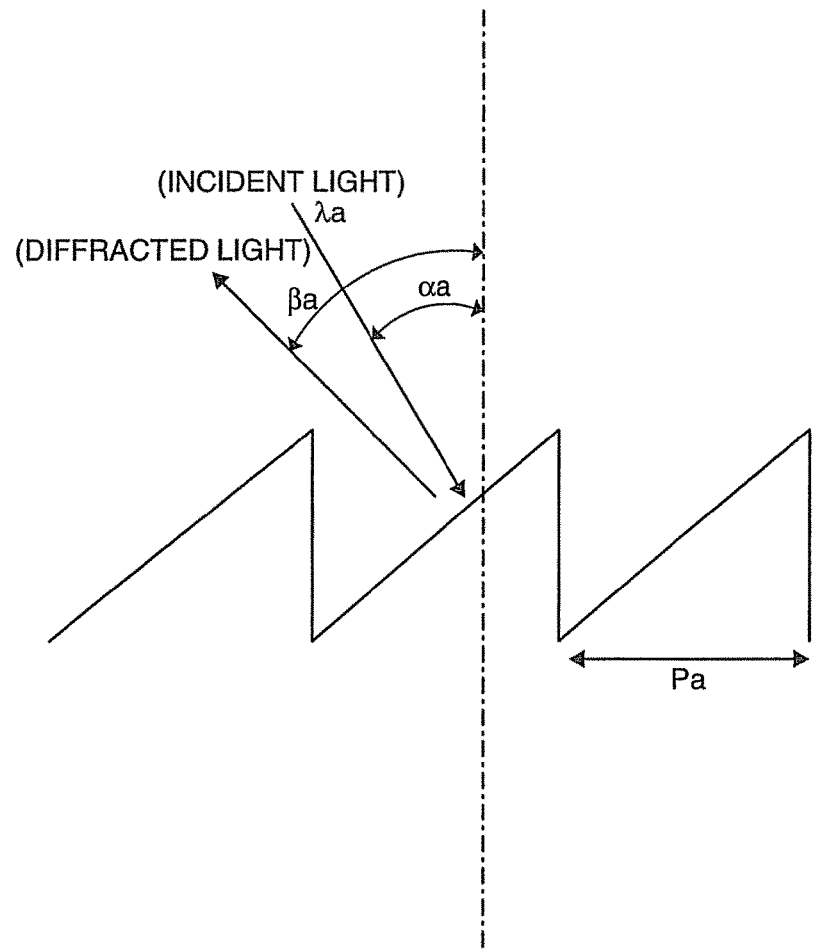
FIG. 1 shows an example of a blazed diffraction grating as a Comparison Example of an embodiment of the invention.

FIG. 1 shows an example of a blazed diffraction grating as a Comparison Example of the present embodiment. As shown in FIG. 1, assume Pa is the grating period of the blazed diffraction grating, $\lambda a$ is the wavelength of incident light, $\alpha a$ is the angle of incidence of the incident light, and $\beta a$ is the angle of diffraction of diffracted light.

Consider first the wavelength resolution. The wavelength resolution $\Delta\beta/\Delta\lambda$ of a diffraction grating is expressed by the following Equation (1). Equation (1) shows that the wavelength resolution $\Delta\beta/\Delta\lambda$ can be increased by shortening the grating period Pa and/or increasing the angle of diffraction $\beta a$.

$$\Delta\beta/\Delta\lambda=1/(Pa\times\cos\beta a) \quad (1)$$

Figure 2:
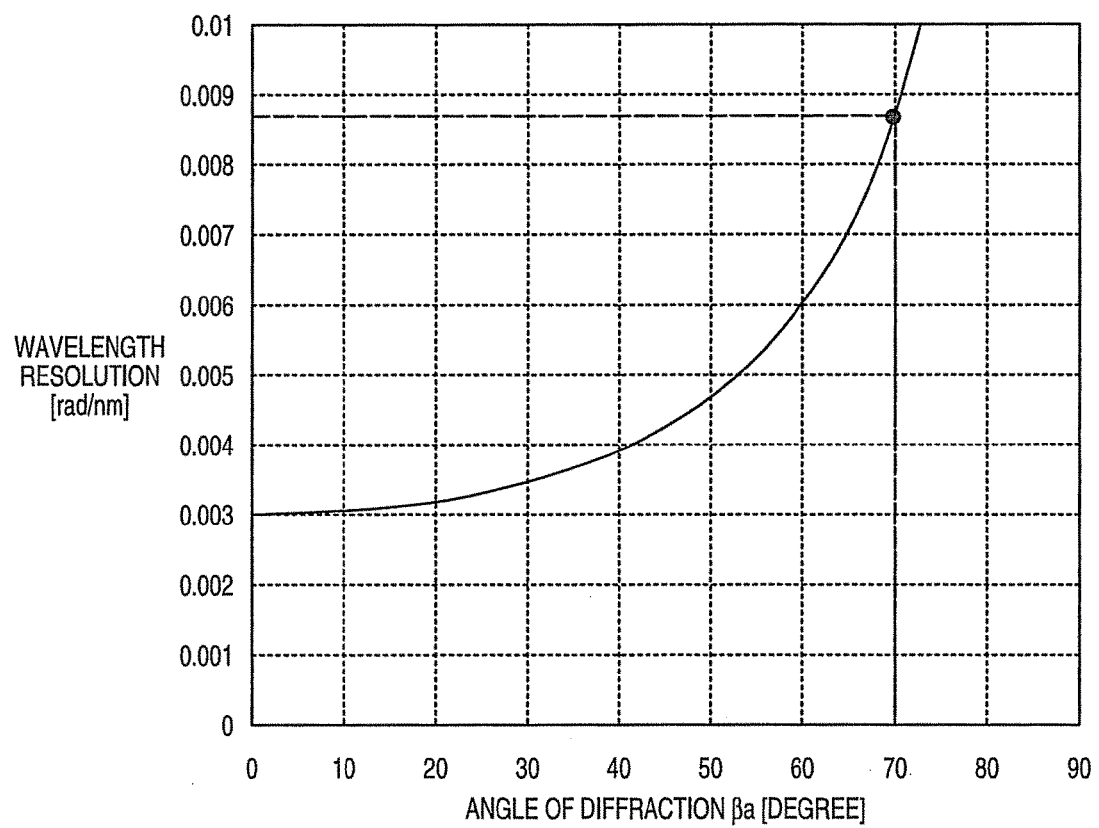
FIG. 2 shows an example of a characteristic curve representing wavelength resolution versus the angle of diffraction in the Comparison Example.

FIG. 2 shows an example of a characteristic curve representing the wavelength resolution $\Delta\beta/\Delta\lambda$ versus the angle of diffraction $\beta a$. The characteristic curve is drawn by using Equation (1) under the conditions that the wavelength $\lambda a$ is 633 nm and the grating period Pa is 333 nm. In this example, the ratio of the wavelength to the grating period $\lambda a/Pa$ is 1.9. When the angle of diffraction $\beta a$ is 70°, the wavelength resolution $\Delta\beta/\Delta\lambda$ is improved to approximately 0.009, as shown in FIG. 2.

Consider next the diffraction efficiency. In a reflective diffraction grating, blazing the cross-sectional shape thereof allows the diffraction efficiency to be increased. Shortening the grating period Pa in order to improve the wavelength resolution $\Delta\beta/\Delta\lambda$, however, makes it difficult to provide high diffraction efficiency even when the cross-sectional shape of the diffraction grating is blazed (Latest edition of Complete Technologies of Diffractive Optical Elements, TECHNICAL INFORMATION INSTITUTE CO., LTD., pp. 107-120 (2004)). As described above, in a blazed diffraction grating and other reflective diffraction gratings, it is difficult to achieve high wavelength resolution and high diffraction efficiency at the same time.

For example, in a Raman spectrometer and other spectrometry apparatuses, a diffraction grating that provides both high wavelength resolution and high diffraction efficiency in a wide wavelength region is desired. In Raman spectrometry, scattered light from a specimen is primarily formed of Rayleigh scattered light and Raman scattered light (In the presence of a wavelength $\lambda$ray of the Rayleigh scattered light and a wavelength $\lambda$ray+$\Delta\lambda$ of the Raman scattered light, a Stokes component having the wavelength $\lambda$ray+$\Delta\lambda$ is hereinafter considered). There are some practical problems in Raman spectrometry. First, the intensity of Raman scattered light is much lower than the intensity of Rayleigh scattered light. Second, to identify a substance based on Raman spectrometry, it is necessary to extract Raman scattered light from the entire scattered light from a specimen with a wavelength resolution of approximately 0.5 nm. Further, the difference in wavelength between Raman scattered light and Rayleigh scattered light is only approximately 100 nm. In consideration of these points, a diffraction grating used in Raman spectrometry is required to provide a high wavelength resolution of approximately 0.5 nm within a range from visible to infrared (400 to 1100 nm in wavelength). In addition to this, it is necessary to provide high diffraction efficiency in a wide wavelength band of approximately 100 nm.

2. Exemplary Configuration

In the present embodiment, the wavelength resolution is improved and the wavelength band where high diffraction efficiency is provided is widened by inclining a periodic structure that causes Bragg reflection to increase the angle of diffraction and lengthen the grating period. A transmissive diffraction grating of the present embodiment (hereinafter abbreviated to a diffraction grating) will be described with reference to FIGS. 3A to 6B. In the drawings, the dimensions and proportions of components are not to scale as appropriate to make the components at least recognizable.

The following description will be made with reference to a case where the diffraction grating is used in surface enhanced Raman scattering spectrometry. In the present embodiment, the diffraction grating can be used not only in the case described above but also in a variety of spectrometric approaches.

Figure 3A:
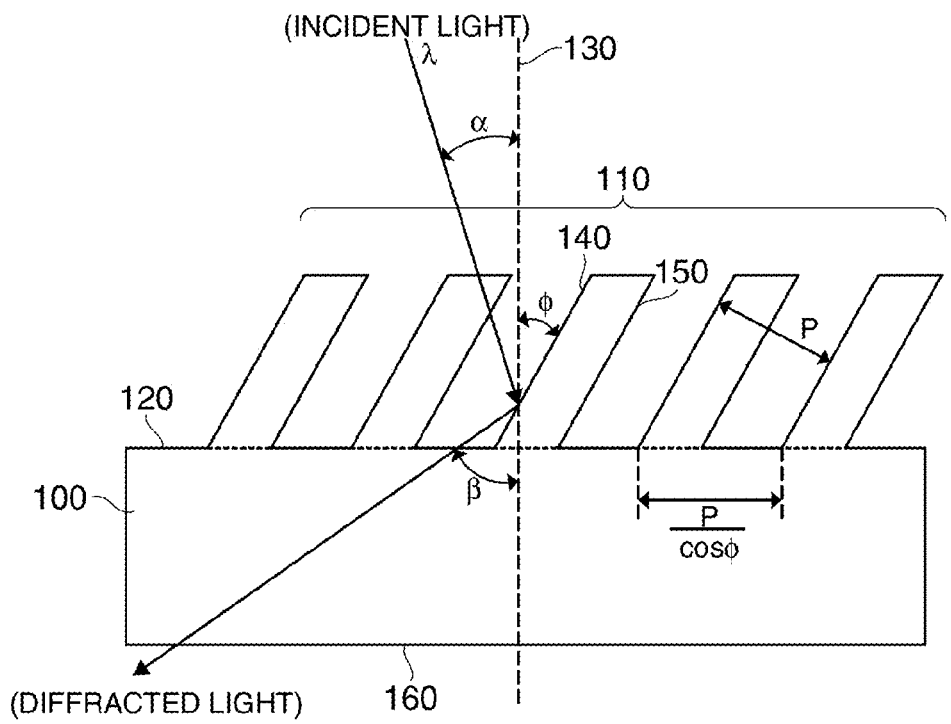
FIG. 3A is a cross-sectional view of an exemplary configuration of a diffraction grating according to the present embodiment.

FIG. 3A is a cross-sectional view of an exemplary configuration of the diffraction grating according to the present embodiment. The diffraction grating is an indented surface diffraction grating and includes a base 100 (substrate) and a group of protrusions 110 (raised portions). FIG. 3A is a cross-sectional view taken along a plane perpendicular to a flat surface of the base 100 and parallel to the direction in which the group of protrusions 110 is arranged.

The base 100 is formed of a quartz glass substrate or made of any other suitable dielectric material that transmits incident light. The base 100 is shaped into a rectangular or circular flat plate. To make the base 100 transmit incident light, the base 100 may be transparent to the wavelength of the incident light (operating wavelength) or may be semi-transparent, that is, may transmit part of the amount of incident light.

The group of protrusions 110 is made of a first dielectric material (the same dielectric material as that of the base 100, for example) and arranged along a direction parallel to a flat surface of the base 100 at a period P/cos $\phi$(grating spacing). The flat surface of the base 100 means, for example, a surface parallel to a front surface 120 (first surface), on which the group of protrusions 110 are formed, of the base 100. The group of protrusions 110 are formed so that they are inclined relative to a reference line 130 by an angle $\phi$ ($\phi$>0°). More specifically, each of the protrusions 110 has an inclined surface 140 (or inclined surface 150) inclined relative to the reference line 130 by the angle $\phi$. The reference line 130 is a reference for defining the inclination angle $\phi$, the angle of incidence $\alpha$, and the angle of diffraction $\beta$ and, for example, a line vertical to (normal to) the flat surface of the base 100. The inclined surface 140 is periodically arranged at a period P measured in the direction perpendicular to the inclined surface 140, and diffracted light (Bragg reflected light) is produced by the periodic structure having the period P. It is noted that the operating wavelength $\lambda$ and the grating period P desirably satisfy 1.0<$\lambda$/P<2.0. It is further desirable that the grating period P ranges from 200 to 1100 nm and the height of the group of protrusions 110 ranges from 500 to 3000 nm. The inclination angle $\phi$ is desirably smaller than 45°.

As shown in FIG. 3A, incident light of the wavelength $\lambda$ is incident on the diffraction grating at an angle $\alpha$, and diffracted light passes through a rear surface 160 (second surface) of the base 100 at an angle $\beta$. The rear surface 160 of the base 100 is a surface on which the group of protrusions 110 is not formed. The wavelength resolution $\Delta\beta/\Delta\lambda$ of the diffraction grating having protrusions inclined by the inclination angle $\phi$ is expressed by the following Equation (2). Substituting $\phi$=0 into Equation (2) derives Equation (1) described above, which represents the wavelength resolution provided when the group of protrusions is not inclined.

$$\Delta\beta/\Delta\lambda = \cos\phi/(P \times \cos\beta) \quad (2)$$

Figure 3B:
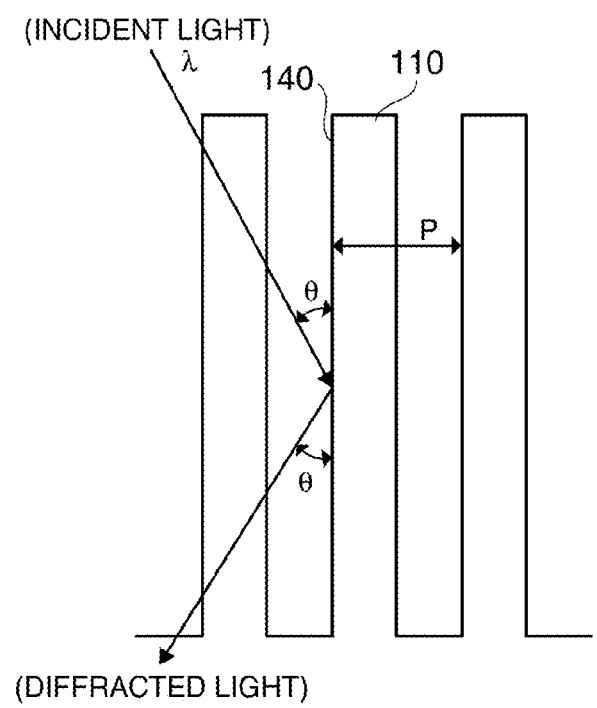
FIG. 3B shows Bragg reflection caused by a periodic structure having inclined surfaces.

A method for improving the wavelength resolution and the diffraction efficiency according to the present embodiment will be described next. In the present embodiment, Bragg reflection caused by the periodic structure having the inclined surfaces 140 (or inclined surfaces 150) is used, as shown in FIG. 3B. In FIG. 3B, a case where the inclination angle $\phi$=0° is considered for convenience. Let Bragg angle $\theta$ be the angle of incidence of incident light that causes Bragg reflection, and the Bragg condition is expressed by the following Equation (3). The Bragg angle $\theta$ is measured from the inclined surface 140, and n represents the refractive index of air (medium in a broader sense).

$$2 \times n \times P \sin\theta = \lambda \quad (3)$$

As described with reference to the Comparison Example, it is necessary to increase the Bragg angle $\theta$ (angle of diffraction) in order to increase the wavelength resolution $\Delta\beta/\Delta\lambda$. Equation (3) shows that increasing the Bragg angle $\theta$ requires shortening P. As described with reference to the Comparison Example, however, shortening P disadvantageously narrows the wavelength band where high diffraction efficiency is provided. To address this problem, the angle of diffraction $\beta$ is increased by inclining the group of protrusions 110 in the present embodiment, as shown in FIG. 3A. As a result, the angle of incidence $\alpha$ becomes approximately $\alpha=\theta-\phi$, and the angle of diffraction $\beta$ becomes approximately $\beta=\theta-\phi$. Since inclining the group of protrusions 110 not only allows the Bragg angle $\theta$ to be smaller than the angle of diffraction $\beta$ so that the wavelength resolution $\Delta\beta/\Delta\lambda$ is increased by the increased angle of diffraction $\beta$ but also allows the period P to be greater than that for $\phi$=0°.

In this way, not only can the angle of diffraction $\beta$ be increased so that the wavelength resolution is improved, but also the period P can be maximized to the extent that necessary wavelength resolution is provided so that the wavelength band where high diffraction efficiency is provided is widened at the same time. It is noted, as will be described later, that the angle of incidence and the angle of diffraction do not necessarily exactly satisfy $\alpha=\theta-\phi$ and $\beta=\theta+\phi$, respectively.

3. Specific Exemplary Configuration

Figure 4:
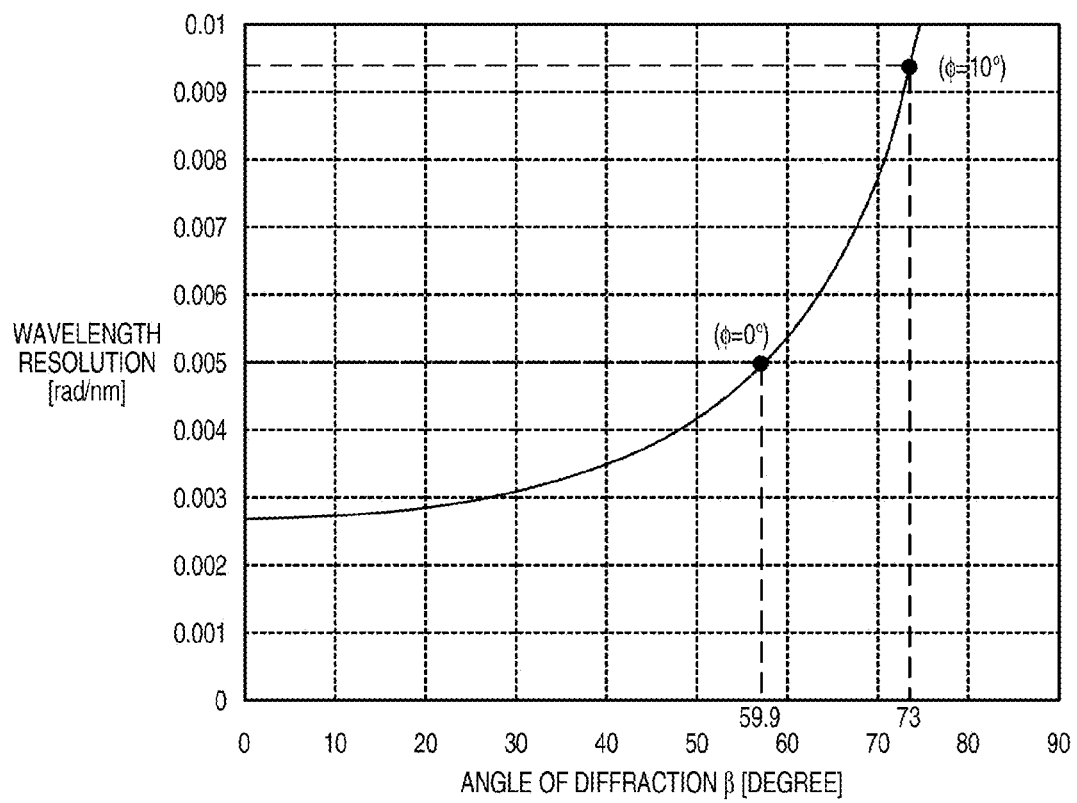
FIG. 4 shows an example of the characteristic curve representing the wavelength resolution versus the angle of diffraction in the present embodiment.

FIG. 4 shows an example of a characteristic curve representing the wavelength resolution $\Delta\beta/\Delta\lambda$ versus the angle of diffraction $\beta$. FIG. 4 shows a case under the following conditions: The wavelength $\lambda$ is 633 nm; the grating period P is 366 nm; the inclination angle $\phi$ is 10°, and the Bragg angle $\theta$ for first-order transmitted diffracted light is 59.9°. The grating period P of 366 nm is 10% greater than the grating period Pa of 333 nm in the Comparison Example described above. Further, Equation (2) shows that the wavelength resolution of the diffraction grating is the same as the wavelength resolution of a diffraction grating having surfaces that are arranged at a period P/cos $\phi$=366/cos(10°)=372 nm but are not inclined.

When the grating is not inclined, that is, $\phi$=0°, the diffraction efficiency of the first-order diffracted light is maximized when the angle of diffraction is close to the Bragg angle of 59.9°. In this case, the wavelength resolution $\Delta\beta/\Delta\lambda$ is 0.005 at the maximum, as shown in FIG. 4. On the other hand, when the grating is inclined by $\phi$=10°, the angle of diffraction $\beta$ is increased to 73°, whereby the wavelength resolution is improved by a factor of approximately 1.8 from the value for $\phi$=0° and $\Delta\beta/\Delta\lambda$ becomes 0.009 or greater, which is comparable with the wavelength resolution in the Comparison Example described above. Inclining the surfaces of the diffraction grating by the angle $\phi$ of 10° thus allows high diffraction efficiency to be provided in the vicinity of the angle of diffraction $\beta$ of 73°.

FIGS. 5A and 5B show exemplary characteristic curves representing the diffraction efficiency versus the angle of incidence $\alpha$. ***The characteristic curves are obtained under the following conditions: The wavelength $\lambda$ is 633 nm; the grating period P is 366 nm; and the grating height is 745 nm. The base (and the group of protrusions) of the grating is made of quartz glass having a refractive index of 1.46. The incident light is linearly polarized, and the direction of the polarization (polarization orientation) is parallel to the grooves of the grating.

When the diffraction grating has no inclined surfaces, that is, when $\phi=0°$, high diffraction efficiency is provided when the angle of incidence $\alpha$ is close to the Bragg angle of 59.9°, as indicated by A1 in FIG. 5A. When the angle of incidence $\alpha$ is 59.9°, the angle of diffraction $\beta$ is also 59.9°. On the other hand, when the diffraction grating has surfaces inclined by $\phi=10°$, high diffraction efficiency is provided when the angle of incidence $\alpha$ is close to 43°, as indicated by B1 in FIG. 5B. For example, when the angle of incidence $\alpha$ is 46°, the angle of diffraction $\beta$ is derived from the characteristic curve to be 73°. In this case, the wavelength resolution $\Delta\beta/\Delta\lambda$ is improved by a factor of 1.8 to approximately 0.009, as described with reference to FIG. 4.

As described above, inclining the surfaces of the diffraction grating by 10° allows the wavelength resolution $\Delta\beta/\Delta\lambda$ to be increased to 0.009, which is comparable with the wavelength resolution in the Comparison Example, even when the grating period is 10% larger than that in the Comparison Example. The reason for this is that the angle of diffraction $\beta$ can be sufficiently large by inclining the surfaces of the diffraction grating to change the Bragg angle.

FIGS. 6A and 6B show exemplary characteristic curves representing the diffraction efficiency versus the wavelength $\lambda$. The characteristic curves are obtained under the following conditions: The wavelength $\lambda$ is 633 nm and the grating period P is 333 nm (FIG. 6A) or 366 nm (FIG. 6B). The incident light is linearly polarized, and the polarization direction is parallel to the grooves of the grating.

When the grating period P is relatively short, high wavelength resolution $\Delta\beta/\Delta\lambda$ is expected to be achieved even when the grating is not inclined, as described in the Comparison Example. Shortening the grating period P, however, narrows the wavelength band where high diffraction efficiency is provided. Specifically, when the grating period P is 333 nm, the wavelength band where high diffraction efficiency, for example, greater than or equal to 0.8 is provided is narrow, ranging from 560 to 640 nm as shown in FIG. 6A, which cannot ensure the wavelength band of 100 nm required for Raman spectroscopy. The reason for this is that the long-wavelength end of the wavelength band where high diffraction efficiency is provided is close to the boundary between a diffraction region ($\lambda/P \leq 2$, for example) and a non-diffraction region ($\lambda/P > 2$).

On the other hand, when the grating period P is 366 nm, the long-wavelength end of the wavelength band where high diffraction efficiency is provided is separate from the boundary between the diffraction region and the non-diffraction region, as shown in FIG. 6B. As a result, the wavelength band where high diffraction efficiency greater than or equal to 0.8 is provided is widened toward the long wavelength side and ranges from 565 to 675 nm, which can ensure the wavelength band of 100 nm required for Raman spectroscopy.

In a blazed grating and other reflective diffraction gratings of the related art, since it is necessary to reduce the angle of diffraction $\beta$ and shorten the period P in order to improve the wavelength resolution, it is difficult to improve both the wavelength resolution and the bandwidth where high diffraction efficiency is provided, as described above.

On the other hand, the diffraction grating of the present embodiment is a transmissive diffraction grating (spectrometry apparatus in a broader sense) that transmits incident light. The transmissive diffraction grating includes the inclined surfaces 140 (or inclined surfaces 150) made of the first dielectric material, as shown in FIG. 3A. The inclined surfaces 140 are inclined relative to the reference line 130 by the angle $\phi$ and arranged so that the period measured in the direction perpendicular to the inclined surfaces 140 is P. The angle of incidence of the light incident on the transmissive diffraction grating with respect to the reference line 130 is $\alpha$, and the angle of diffraction of the diffracted light with respect to the reference line 130 is $\beta$.

In this case, the incident light is incident at the angle of incidence $\alpha$, which is smaller than the Bragg angle $\theta$ ($\alpha<\theta$) determined by the period P at the inclined surfaces 140 are arranged. On the other hand, the incident light is diffracted at the angle of diffraction $\beta$, which is greater than the Bragg angle $\theta$ ($\beta>\theta$).

As a result, the wavelength resolution can be improved, and the band where high diffraction efficiency is provided can be widened. Specifically, arranging the inclined surfaces 140 at the period P allows the diffraction grating to have a one-dimensional periodic dielectric constant distribution. When the dielectric constant distribution is formed by inclining the surfaces with respect to the grating, for example, by $\phi=10°$, the angle of incidence $\alpha$ becomes 43°, which is smaller than the Bragg angle $\theta=59.9°$ for non-inclined surfaces, as shown in FIG. 5B, and the angle of diffraction $\beta$ of transmitted light becomes 73°, which is greater than the Bragg angle $\theta=59.9°$ for non-inclined surfaces. That is, the angle of incidence $\alpha$ of the light at which the highest diffraction efficiency is provided is shifted from the Bragg angle $\theta$ to a smaller angle by inclining the surfaces to form the dielectric constant distribution. In this way, even when the period P of the diffraction grating is relatively long, the wavelength resolution $\Delta\beta/\Delta\lambda$ of the diffraction grating can be sufficiently increased, whereby high wavelength resolution (FIG. 4, for example) and high diffraction efficiency in a wide wavelength band (FIG. 6B, for example) are achieved at the same time in the present embodiment. For example, when the present embodiment is used in Raman spectroscopy, very weak Raman scattered light having a wide wavelength band can be efficiently guided to a photodetector.

As another expected advantage, an expensive bandpass filter, which is essential in the related art, will not be required to separate stray light from signal light. That is, since high wavelength resolution is provided, Raman scattered light and Rayleigh scattered light are separated from each other by a sufficient amount, whereby a filter having a sharp cutoff characteristic is not required. Further, since the diffraction grating of the present embodiment is a transmissive diffraction grating, lenses, mirrors, and other optical elements can be relatively freely arranged and the size of the spectrometry apparatus can be reduced accordingly.

In the cross section shown in FIG. 3A, the angle of incidence $\alpha$ of the incident light is measured, for example, in a first direction (counterclockwise or positive direction) with respect to the reference line 130. In this case, the inclination angle $\phi$ of the inclined surfaces 140 is measured in a second direction (clockwise or negative direction), which differs from the first direction, with respect to the reference line 130.

Further, in the present embodiment, the light incident on the transmissive diffraction grating is linearly polarized parallel to the inclined surfaces 140 and perpendicular to the reference line 130.

Light linearly polarized parallel to the grooves of the grating (periodic dielectric constant distribution) can thus be incident on the grating. As a result, the diffraction efficiency characteristic described above (the characteristic curve indicated by B1 shown in FIG. 5B, for example) can be achieved. The present embodiment is not limited to the case described above but is applicable to any case where the incident light contains a polarized component having a polarization direction that is parallel to the inclined surfaces 140 and perpendicular to the reference line 130.

In the present embodiment, the transmissive diffraction grating is formed by arranging the group of protrusions 110, which is made of the first dielectric material, on the base 100, which has a flat surface (surface 120, for example) perpendicular to the reference line 130, along a direction parallel to the flat surface of the base 100 at the period P/cos φ, as shown in FIG. 3A. The group of protrusions 110 has the inclined surfaces 140 inclined relative to the reference line 130 by the angle φ.

The group of thus periodically arranged protrusions 110 provides the inclined surfaces 140 arranged at the period P measured in the direction perpendicular to the inclined surfaces 140. A transmissive diffraction grating having inclined protrusions and depressions can thus be provided.

Further, in the present embodiment, the inclination angle φ is set so that adjacent protrusions 110 do not overlap with each other in a plan view projected perpendicularly onto the flat surface of the base 100.

When the inclination angle φ is set so that the protrusions do not overlap with each other as described above, the group of protrusions 110 will not be unnecessarily high, whereby the group of protrusions 110 can be readily manufactured. Further, since the diffraction efficiency and other performance can be precisely simulated, reliable design can be done.

Figure 8:
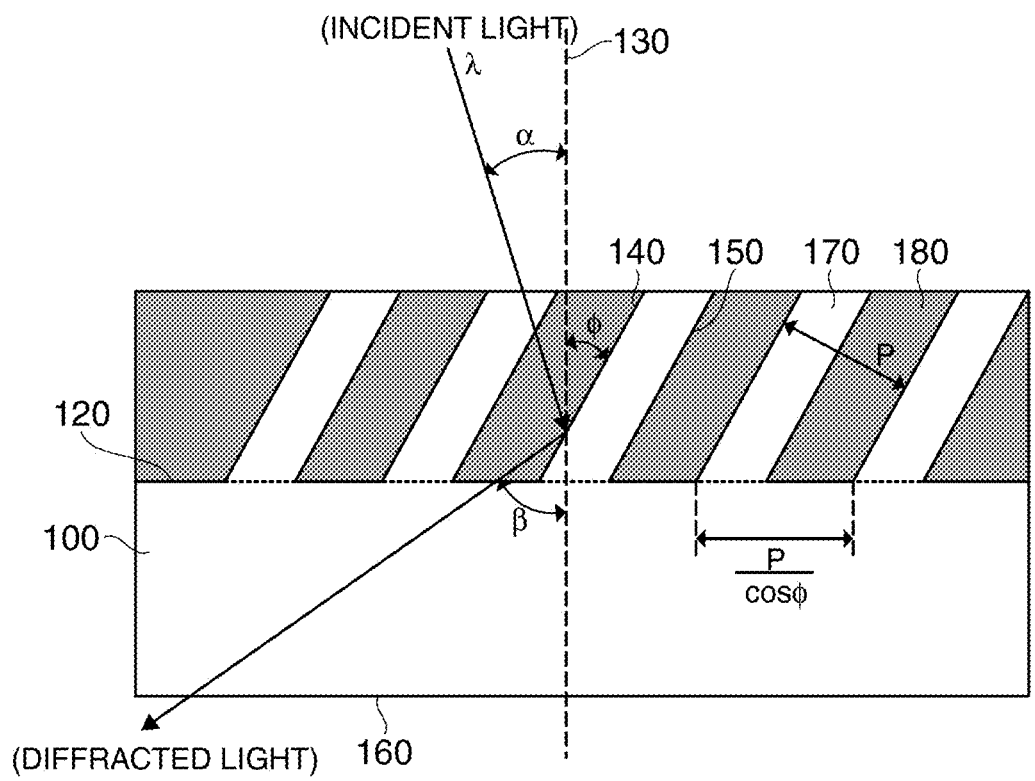
FIG. 8 is a cross-sectional view of a second exemplary configuration of the diffraction grating.

In the present embodiment, the transmissive diffraction grating may alternatively be formed by alternately arranging first dielectric layers 170 (made of a first dielectric material) and second dielectric layers 180 (made of a second dielectric material) having a dielectric constant (refractive index) different from that of the first dielectric layers 170 on the base 100 having a flat surface perpendicular to the reference line 130 at the period P/cos φ along a direction parallel to the flat surface of the base 100, as will be described with reference to FIG. 8. In this case, the boundary surfaces between the first dielectric layers 170 and the second dielectric layers 180 form the inclined surfaces 140 (or inclined surfaces 150).

Since the boundary surfaces between the first dielectric layers 170 and the second dielectric layers 180 are thus periodically arranged, the boundary surfaces can form the inclined surfaces 140 arranged at the period P measured in the direction perpendicular thereto. An inclined, refractive index modulated, transmissive diffraction grating can thus be achieved.

Figure 11A:
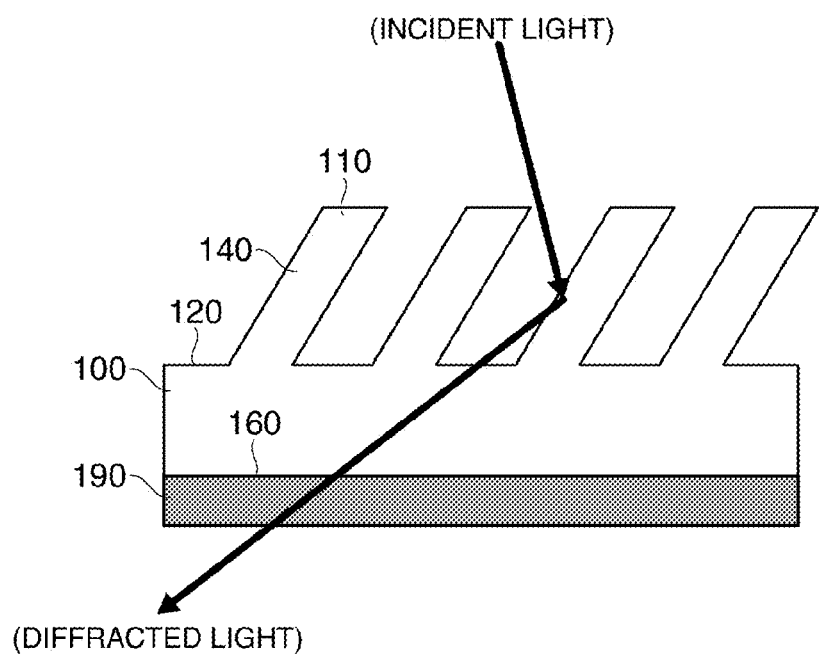
FIGS. 11A and 11B show light being incident on different sides of the diffraction grating.

Moreover, the transmissive diffraction grating in the present embodiment has the inclined surfaces 140 formed on the front surface 120 (first surface), on which light is incident, of the base 100 and an anti-reflection film 190 formed on the rear surface 160 (second surface), through which diffracted light exits, of the base 100, as will be described later with reference to FIG. 11A.

Since the light diffracted at a large angle of diffraction β is not reflected off the rear surface 160 of the base 100, the amount of the diffracted light passing through the rear surface 160 will be substantially maintained. Since the diffracted light can thus efficiently exit, sensing can be performed with high sensitivity. Further, since light is incident on the inclined surfaces 140 without passing through the base 100, diffracted light can be efficiently produced.

4. Manufacturing Method

A method for manufacturing the transmissive diffraction grating having the group of inclined protrusions will be described with reference to FIGS. 7A to 7D.

Figure 7A:
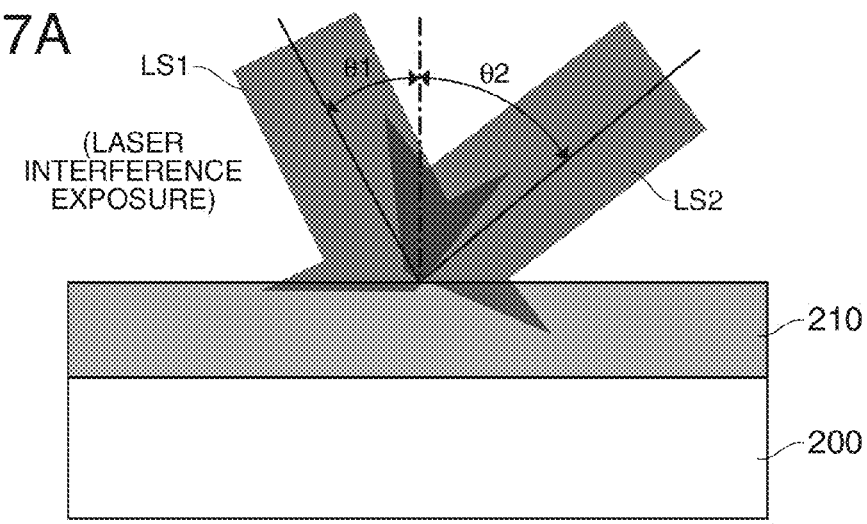
FIGS. 7A to 7D describe a method for manufacturing the diffraction grating.

A photoresist 210 is first applied onto a quartz glass substrate 200, as shown in FIG. 7A. The photoresist 210 is then irradiated with laser light LS1 at an angle of incidence θ1 and laser light LS2 at an angle of incidence θ2 so that the photoresist 210 undergoes laser interference exposure. The spacing D between interference fringes produced by the interference exposure is expressed by the following Equation (4). In Equation (4), λs represents the wavelength of the laser light LS1 and LS2. Further, the inclination angle φ of the interference fringes in the photoresist is expressed by the following Equation (5). In Equation (5), $n_r$ represents the refractive index of the photoresist 210 for the wavelength λs of the exposure light, and θ2 is greater than θ1.

$$D=\lambda s/(\sin(\theta 1)+\sin(\theta 2)) \quad (4)$$

$$\phi=(\sin^{-1}(\sin(\theta 2)/n_r)-\sin^{-1}(\sin(\theta 1)))/2 \quad (5)$$

For example, a laser light source for the interference exposure is a continuous-wave He—Cd laser (wavelength λs=325 nm), and the photoresist 210 is a positive photoresist, applied to a film thickness of 1 μm. Further, the angles of incidence θ1 and θ2 of the laser light are 9.1° and 45.7°, respectively, and the refractive index $n_r$ of the photoresist is 1.60. Under these conditions, the spacing D between the interference fringes measured in a direction parallel to the flat surface of the substrate 200 is calculated by Equation (4) described above to be 372 nm. Further, the inclination φ of the interference fringes is calculated by Equation (5) described above to be approximately 10° (φ=10.4°). The period of the interference fringes measured in the direction perpendicular to the inclination is calculated by D×cos φ to be 366 nm. With the left and right interference angles (θ1 and θ2) being asymmetric with respect to a normal to the substrate 200 as described above, a latent image of the inclined interference fringes is formed in the photoresist 210.

Figure 7B:
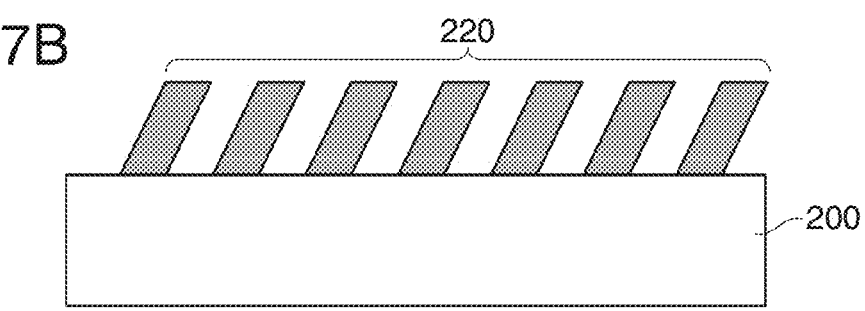
Figure 7C:
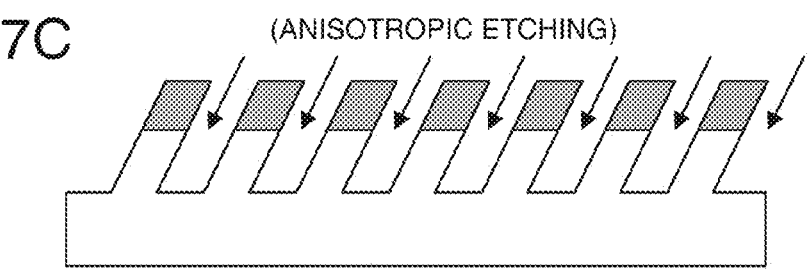
Figure 7D:
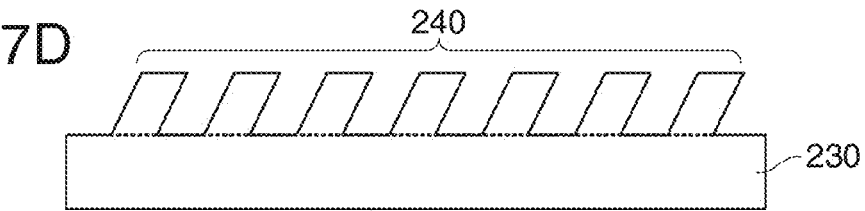

The photoresist 210 that has been exposed to light is next developed so that a one-dimensional photoresist pattern 220 inclined by 10° is formed, as shown in FIG. 7B. The photoresist pattern 220 is then used as a mask and the quartz glass substrate is etched in an anisotropic dry etching process in a direction inclined by 10°, as shown in FIG. 7C. The etching gas can, for example, be $CF_4$ or $CHF_3$. The etching depth can be adjusted by lengthening or shortening the etching period. The photoresist left after the etching process is removed by oxygen plasma, as shown in FIG. 7D. A group of protrusions 240 inclined by 10° is thus formed, and a one-dimensional transmissive diffraction grating having the group of inclined protrusions 240 arranged on the surface of a base 230 is formed.

The above description has been made with reference to the case where the group of protrusions 240 is made of the same quartz glass material as that of the base 200, but the present embodiment is not limited thereto. For example, the group of protrusions 240 may be made of a material different from that of the base 200 by filling the photoresist pattern 220 shown in FIG. 7B with a resin (polymer) material, hardening the resin material, and stripping off the photoresist pattern 220.

5. Second Exemplary Configuration

The above embodiment has been described with reference to a diffraction grating that causes Bragg reflection by using inclined surfaces of a group of protrusions. On the other hand, the present embodiment may be configured so that Bragg reflection is caused by an inclined, refractive index modulated structure.

FIG. 8 is a cross-sectional view showing a second exemplary configuration of the present embodiment. A transmissive diffraction grating having the second exemplary configuration includes a base 100, first dielectric layers 170, and second dielectric layers 180. The first dielectric layers 170 are made of a first dielectric material having a first dielectric constant (first refractive index). The second dielectric layers 180 are made of a second dielectric material having a second dielectric constant (second refractive index) different from the first dielectric constant.

The first dielectric layers 170 and the second dielectric layers 180 are alternately and periodically arranged. Specifically, the first dielectric layers 170 are arranged at a period $P/\cos\phi$ along a direction parallel to the flat surface of the base. The second dielectric layers 180 are formed between first dielectric layers 170. The boundary surfaces between the first dielectric layers 170 and the second dielectric layers 180 form inclined surfaces 140 (or inclined surfaces 150) inclined relative to a reference line 130 by an angle $\phi$. The first dielectric layers 170 (or the second dielectric layers 180) are arranged at a period P measured in the direction perpendicular to the boundary surfaces.

For example, the transmissive diffraction grating described above is manufactured in the following steps: First, the first dielectric layers 170 are formed by filling the photoresist pattern 220 shown in FIG. 7B with a first resin (first polymer) material, hardening the first resin material, and stripping off the photoresist pattern 220. The second dielectric layers 180 are then formed by filling the gaps between the thus formed first dielectric layers 170 with a second resin (second polymer) material and hardening the second resin material.

6. Detection Apparatus

Figure 9A:
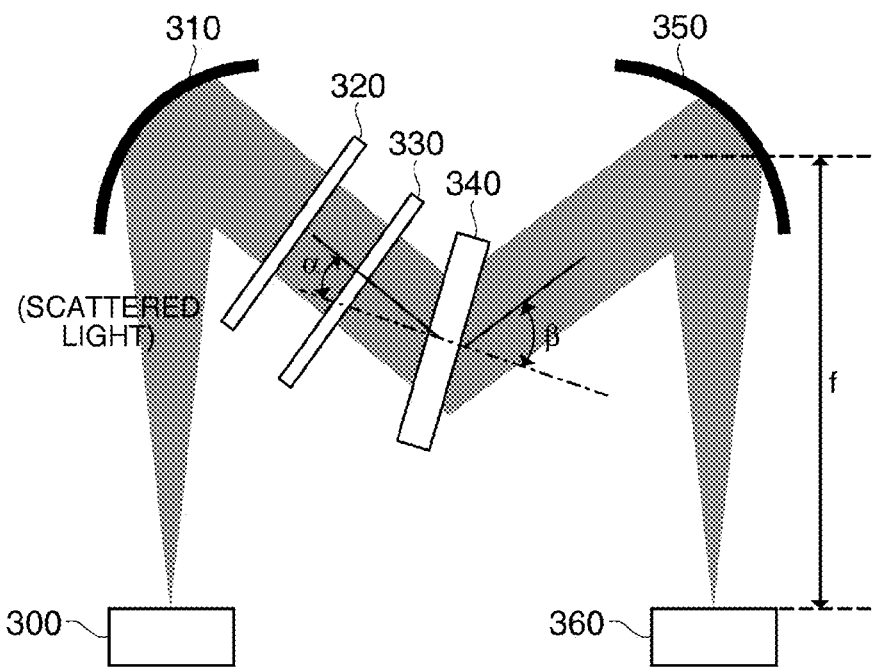
FIGS. 9A and 9B show a first exemplary configuration of a detection apparatus.
Figure 9B:
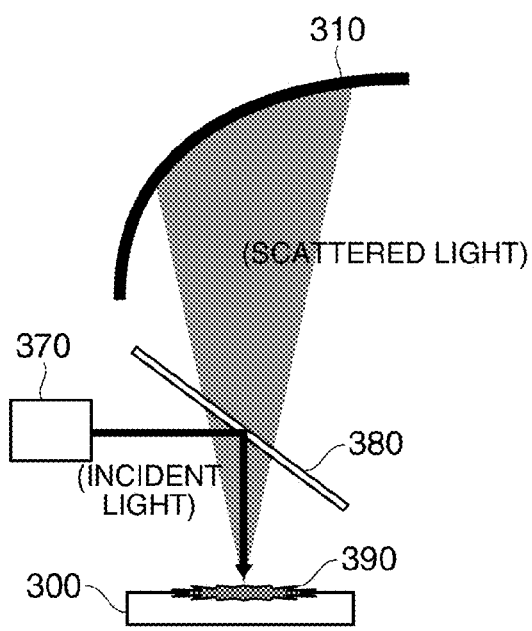

FIGS. 9A and 9B show a first exemplary configuration of a detection apparatus using the diffraction grating of the present embodiment. The detection apparatus includes a Raman sensor 300 (sensor chip, optical device), a first concave mirror 310, a bandpass filter 320, a polarizer 330, a diffraction grating 340, a second concave mirror 350, an arrayed photodetector 360 (detector), a light source 370, and an edge filter 380. The detection apparatus is a single spectrometry apparatus having one diffraction grating 340 and two concave mirrors 310 and 350 disposed in accordance with a predetermined positional relationship. The following description will be made of a detection apparatus for Raman spectroscopy, but the diffraction grating of the present embodiment can be used in detection apparatus based on other spectrometric approaches as well.

Laser light from the light source 370 is reflected off the edge filter 380, and a specimen 390 (target) on the Raman sensor 300 is irradiated with the reflected laser light, as shown in FIG. 9B. For example, the light source 370 is a continuous-wave He—Ne laser (wavelength of 633 nm and output of 20 mW). The specimen 390 irradiated with the laser light produces Rayleigh scattered light and Raman scattered light in surface enhanced Raman scattering caused by the Raman sensor 300. The scattered light is incident on the edge filter 380, which reflects the light having the wavelength of the laser light (633 nm) and transmits the light having longer wavelengths. That is, the edge filter 380 reflects the Rayleigh scattered light and transmits the Raman scattered light. The Raman scattered light having passed through the edge filter 380 is incident on the concave mirror 310 and collimated by the concave mirror 310.

The light reflected off the concave mirror 310 passes through the bandpass filter 320 and the polarizer 330 and enters the diffraction grating 340 at a predetermined angle of incidence $\alpha$, as shown in FIG. 9A. The bandpass filter 320 further blocks the Rayleigh scattered light and transmits only the Raman scattered light. The polarizer 330 converts the light to be incident on the diffraction grating 340 into linearly polarized light having a polarization orientation parallel to the grooves of the diffraction grating 340. The light incident on the diffraction grating 340 is diffracted at an angle of diffraction $\beta$, when passing therethrough, and separated into Raman scattered light fluxes having slightly different wavelengths and hence having been diffracted at slightly different angles of diffraction. Each of the Raman scattered light fluxes is collimated light. The thus separated Raman scattered light fluxes are incident on the concave mirror 350, which focuses the scattered light fluxes on the arrayed photodetector 360, which forms a spectral distribution. The arrayed photodetector 360 then detects the spectral distribution of the Raman scattered light.

The wavelength resolution of the detection apparatus will be specifically described next. Now, let $X(\lambda)$ be the position of the Rayleigh scattered light on the arrayed photodetector 360 and $X(\lambda+\Delta\lambda)$ be the position of the Raman scattered light (Stokes light). The distance between these positions is expressed by the following Equation (6). In Equation (6), f represents the light focusing distance (focal length) of the concave mirror 350, and $\Delta\beta/\Delta\lambda$ represents the wavelength resolution of the diffraction grating.

$$X(\lambda+\Delta\lambda)-X(\lambda)=f\times\Delta\lambda\times(\Delta\beta/\Delta\lambda) \qquad (6)$$

Equation (6) shows that a sufficiently high wavelength resolution $\Delta\beta/\Delta\lambda$ allows the Raman scattered light and the Rayleigh scattered light to be separated from each other by a sufficient amount even when the light focusing distance f of the concave mirror is short. Using the high-resolution diffraction grating of the present embodiment therefore allows the light focusing distance f of the concave mirror 350 to be shortened, the components in the detection apparatus to be disposed in a compact layout, and the size of the detection apparatus to be reduced.

For example, the diffraction grating described with reference to FIG. 3A and other figures has a period of 366 nm (2700 lines/mm), an inclination angle of 10°, and a wavelength resolution of 0.009 rad/nm. In this case, when a concave mirror having a focal length f of 10 mm is used, two scattered light components having wavelengths different from each other by $\Delta\lambda=0.5$ nm can be separated from each other by 45 μm on the arrayed photodetector 360. The distance is long enough to be resolved with a typical arrayed photodetector. As described above, even when a concave mirror having a short light focusing distance is used, sufficient resolution is achieved by using the diffraction grating of the present embodiment. The distance from the Rayleigh scattered light to the Raman scattered light is approximately 45 μm×100/0.5=9 mm. The distance is long enough to separate the Rayleigh scattered light and the Raman scattered light from each other by a sufficient amount. The burden of blocking the Rayleigh scattered light on the characteristics of the bandpass filter 320 is therefore greatly reduced. In spectrometric applications in which relatively low detection accuracy may suffice, the bandpass filter 320 can be omitted.

Figure 10A:
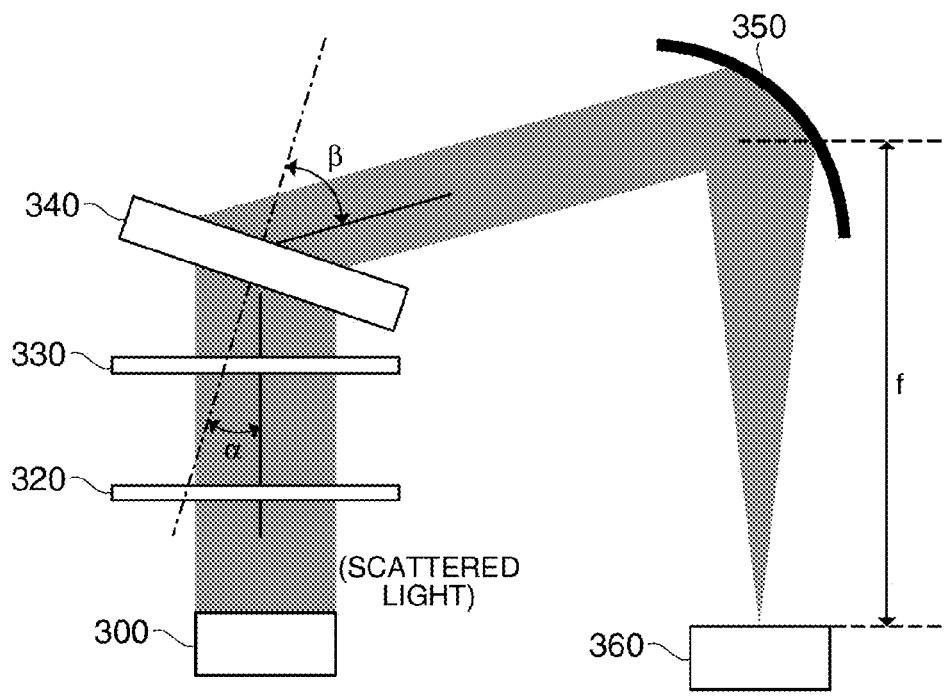
FIGS. 10A and 10B show a second exemplary configuration of a detection apparatus.
Figure 10B:
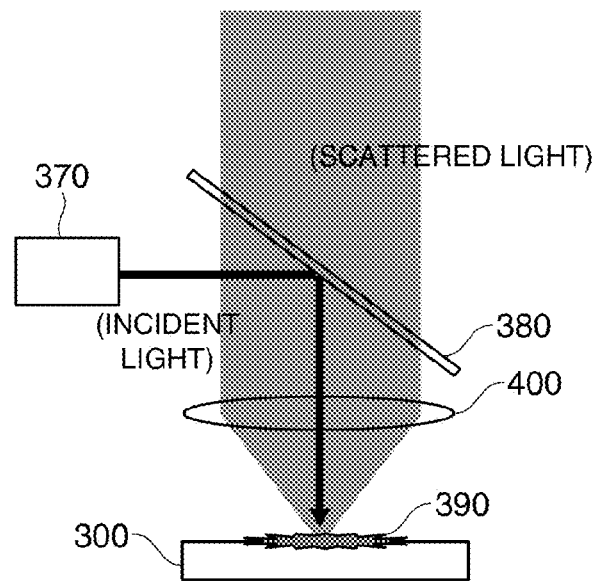

FIGS. 10A and 10B show a second exemplary configuration of the detection apparatus using the diffraction grating of the present embodiment. The detection apparatus includes a Raman sensor 300, a bandpass filter 320, a polarizer 330, a diffraction grating 340, a concave mirror 350, an arrayed photodetector 360, a light source 370, an edge filter 380, and a lens 400. The detection apparatus is a single spectrometry apparatus having one diffraction grating 340 and one concave mirror 350 disposed in accordance with a predetermined positional relationship. The same components as those described with reference to FIGS. 9A and 9B have the same reference characters, and no description will be made of these components as appropriate.

Laser light from the light source 370 is reflected off the edge filter 380, and a specimen 390 (target) on the Raman sensor 300 is irradiated with the reflected laser light, as shown in FIG. 10B. The scattered light from the specimen 390 is incident on the edge filter 380, which transmits Raman scattered light. The Raman scattered light having passed through the edge filter 350 is incident on the lens 400 and collimated by the lens 400.

The collimated light from the lens 400 then passes through the bandpass filter 320 and the polarizer 330 and enters the diffraction grating 340 at a predetermined angle of incidence $\alpha$, as shown in FIG. 10A. The lens 400 has converted the entire scattered light from the specimen 390 into collimated light of a high degree of parallelism, which is then incident on the diffraction grating 340. The diffraction grating 340 can therefore make use of its high wavelength resolution to separate very weak light. The light incident on the diffraction grating 340 is diffracted at an angle of diffraction $\beta$, when passing therethrough, and separated into Raman scattered light fluxes, which are incident on the concave mirror 350, which focuses the scattered light fluxes on the arrayed photodetector 360, which then detects a spectral distribution.

According to the second exemplary configuration, sufficient resolution (45 μm/0.5 nm, for example) can be achieved by using the concave mirror 350 having a short light focusing distance (f=10 mm, for example), and the burden on the bandpass filter 320 can be reduced, as in the first exemplary configuration described above. Further, the volume of the space occupied by the components of the detection apparatus can be further reduced, whereby the detection apparatus can be more compact. Moreover, in the second exemplary configuration, since collimated scattered light is incident on the edge filter 380, the edge filter 380 can more effectively select the intended wavelength.

Figure 11B:
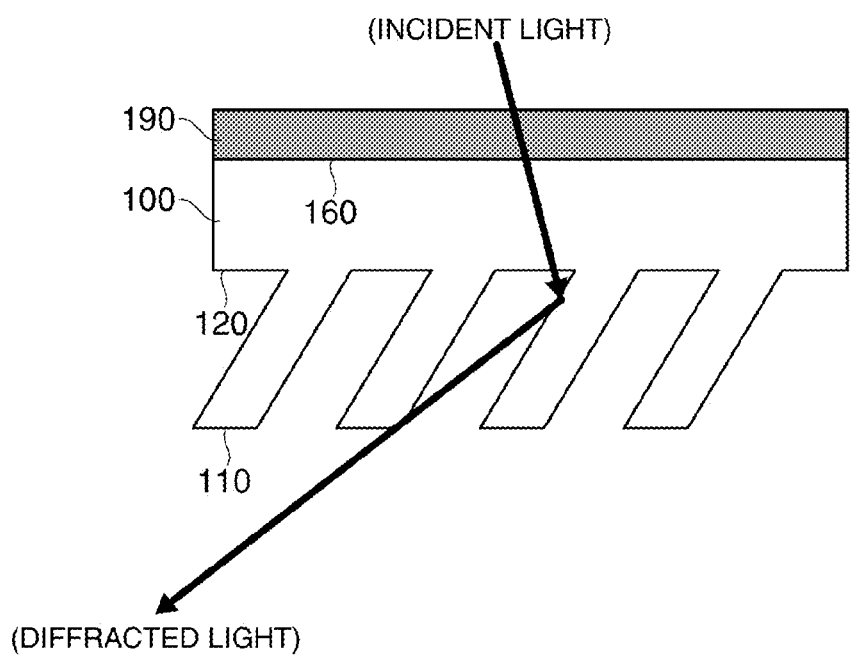

The side of the diffraction grating 340 on which light is incident will be described with reference to FIGS. 11A and 11B. In an exemplary arrangement shown in FIG. 11A, light is incident on the indented surface (the surface 120 on which the group of protrusions 110 are arranged) of the diffraction grating 340. On the other hand, in an exemplary arrangement shown in FIG. 11B, light is incident on the rear surface 160 of the diffraction grating 340. In either of the exemplary arrangements, the anti-reflection film 190 is formed on the rear surface 160 of the base 100. Since the anti-reflection film 190 suppresses reflection of the diffracted light or the incident light, high diffraction efficiency close to a theoretical value can be achieved. Since the dependence of the diffraction efficiency on the wavelength or the angle slightly depends on which side the light is incident on, the diffraction grating is desirably used in the characteristically superior one of the exemplary arrangements.

The present embodiment has been described above in detail, and those skilled in the art can readily understand that many changes can be made to the present embodiment without substantially departing from the novel features and advantageous effects of the invention. It is therefore intended that the invention encompass all such changes. For example, a term (transmissive diffraction grating, Raman sensor, and arrayed photodetector, for example) set forth in the specification or the drawings at least once along with a different term (diffraction grating, sensor chip, and detector, for example) but having a meaning in a broader sense or having the same meaning can be replaced with the different term in any location in the specification or the drawings. The configurations and operations of the diffraction grating, the spectrometry apparatus, the detection apparatus, and other apparatus are not limited to those described in the present embodiment but can be changed in a variety of ways.

What is claimed is:

1. A spectrometry apparatus comprising:
   a transmissive diffraction grating that transmits incident light having an operating wavelength $\lambda$,
   wherein the transmissive diffraction grating has inclined surfaces made of a first dielectric material,
   the inclined surfaces are inclined relative to a reference line,
   if an angle of incidence of light incident on the transmissive diffraction grating with respect to the reference line is defined as an angle $\alpha$, and an angle of diffraction of diffracted light with respect to the reference line is defined as an angle $\beta$:
      the angle of incidence $\alpha$ is smaller than a Bragg angle $\theta$ defined with respect to the inclined surfaces, and
      the angle of diffraction $\beta$ is greater than the Bragg angle $\theta$,
   if an inclination angle of the inclined surfaces with respect to the reference line is defined as an angle $\phi$:
      the inclined surfaces are arranged at a period P/cos$\phi$ in a direction perpendicular to the reference line, and
      the incident light is linearly polarized parallel to a flat surface perpendicular to the reference line and perpendicular to the direction in which the inclined surfaces are arranged, and $1.0 < \lambda/P < 2.0$.

2. The spectrometry apparatus according to claim 1, wherein
   a group of protrusions made of the first dielectric material is formed at the period P/cos$\phi$ on a flat surface of a base of the transmissive diffraction grating, the flat surface being perpendicular to the reference line and the group of protrusions arranged along a direction parallel to the flat surface of the base, and
   the inclined surfaces inclined relative to the reference line by the angle $\phi$ are formed on the group of protrusions.

3. The spectrometry apparatus according to claim 2, wherein the inclination angle $\phi$ is set so that adjacent protrusions do not overlap with each other in a plan view projected onto the flat surface of the base.

4. The spectrometry apparatus according to claim 1, wherein
   the transmissive diffraction grating is formed by alternately arranging the first dielectric material and a second dielectric material having a dielectric constant different from that of the first dielectric material at the period P/cos$\phi$ on a base having a flat surface perpendicular to the reference line along a direction parallel to the flat surface of the base, and
   the inclined surfaces are formed of boundary surfaces between the first dielectric material and the second dielectric material and inclined relative to the reference line by the angle $\phi$.

5. The spectrometry apparatus according to claim 1, wherein the inclined surfaces of the transmissive diffraction grating are formed on a first surface of a base on which the incident light is incident and an anti-reflection film is formed on a second surface of the base through which the diffracted light exits.

6. A detection apparatus comprising:
   the spectrometry apparatus according to claim 1;

an optical system that causes scattered light or reflected light from a target to be incident on the spectrometry apparatus at the angle of incidence α smaller than the Bragg angle θ; and a detector that detects diffracted light from the spectrometry apparatus.

7. A detection apparatus comprising:

the spectrometry apparatus according to claim 2;

an optical system that causes scattered light or reflected light from a target to be incident on the spectrometry apparatus at the angle of incidence α smaller than the Bragg angle θ; and a detector that detects diffracted light from the spectrometry apparatus.

8. A detection apparatus comprising:

the spectrometry apparatus according to claim 3;

an optical system that causes scattered light or reflected light from a target to be incident on the spectrometry apparatus at the angle of incidence α smaller than the Bragg angle θ; and a detector that detects diffracted light from the spectrometry apparatus.

9. A detection apparatus comprising:

the spectrometry apparatus according to claim 4;

an optical system that causes scattered light or reflected light from a target to be incident on the spectrometry apparatus at the angle of incidence α smaller than the Bragg angle θ; and a detector that detects diffracted light from the spectrometry apparatus.

10. A detection apparatus comprising:

the spectrometry apparatus according to claim 5;

an optical system that causes scattered light or reflected light from a target to be incident on the spectrometry apparatus at the angle of incidence α smaller than the Bragg angle θ; and a detector that detects diffracted light from the spectrometry apparatus.

11. A method for manufacturing the spectrometry apparatus according to claim 1, the method comprising:

irradiating a photoresist applied on a base with first laser light and second laser light so that the photoresist undergoes interference exposure;

developing the photoresist having undergone the interference exposure; and forming a photoresist pattern inclined relative to a normal to a flat surface of the base by the inclination angle φ.

12. A method for manufacturing the spectrometry apparatus according to claim 2, the method comprising:

irradiating a photoresist applied on the base with first laser light and second laser light so that the photoresist undergoes interference exposure;

developing the photoresist having undergone the interference exposure; and forming a photoresist pattern inclined relative to a normal to a flat surface of the base by the inclination angle φ.

13. A method for manufacturing the spectrometry apparatus according to claim 3, the method comprising:

irradiating a photoresist on the base with first laser light and second laser light so that the photoresist undergoes interference exposure;

developing the photoresist having undergone the interference exposure; and forming a photoresist pattern inclined relative to a normal to a flat surface of the base by the inclination angle φ.

14. A method for manufacturing the spectrometry apparatus according to claim 4, the method comprising:

irradiating a photoresist applied on the base with first laser light and second laser light so that the photoresist undergoes interference exposure;

developing the photoresist having undergone the interference exposure; and forming a photoresist pattern inclined relative to a normal to a flat surface of the base by the inclination angle φ.

15. A method for manufacturing the spectrometry apparatus according to claim 5, the method comprising:

irradiating a photoresist applied on the base with first laser light and second laser light so that the photoresist undergoes interference exposure;

developing the photoresist having undergone the interference exposure; and forming a photoresist pattern inclined relative to a normal to a flat surface of the base by the inclination angle φ.

* * * * *